No. 737,186. PATENTED AUG. 25, 1903.
H. C. WILLIAMS.
HOPPLE.
APPLICATION FILED JULY 2, 1903.
NO MODEL.
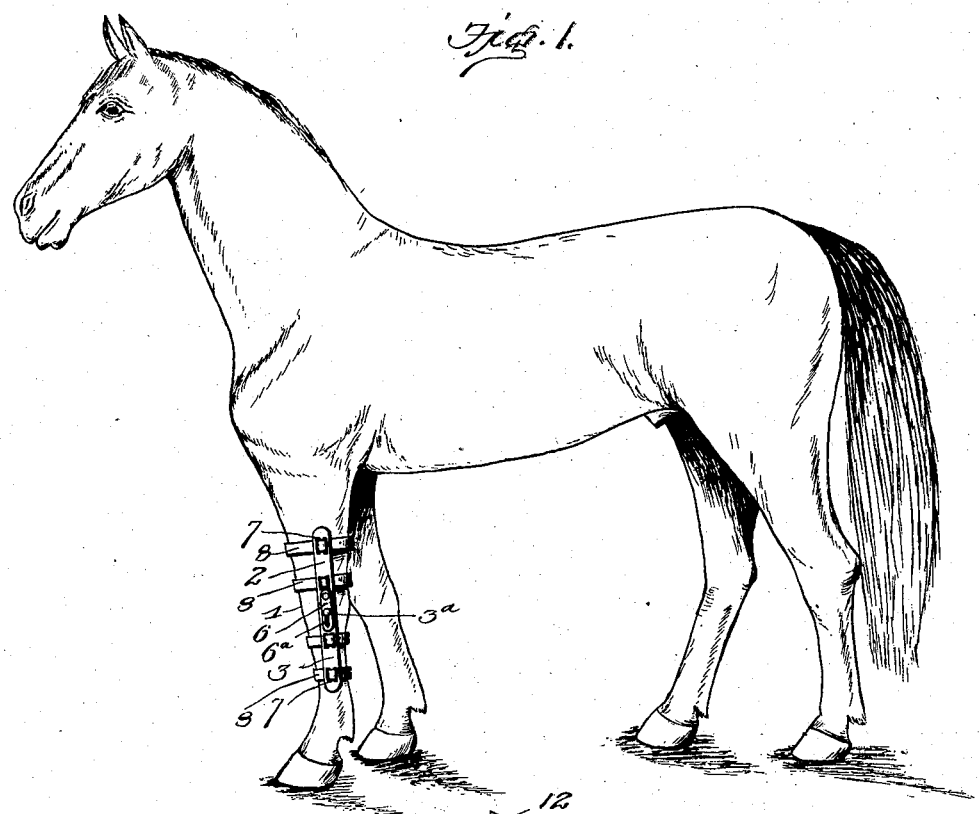
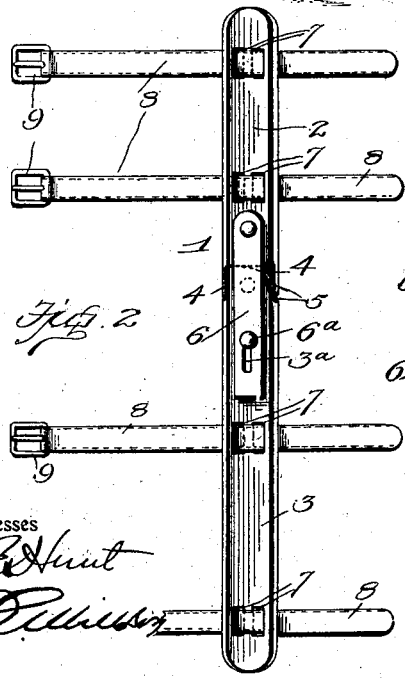
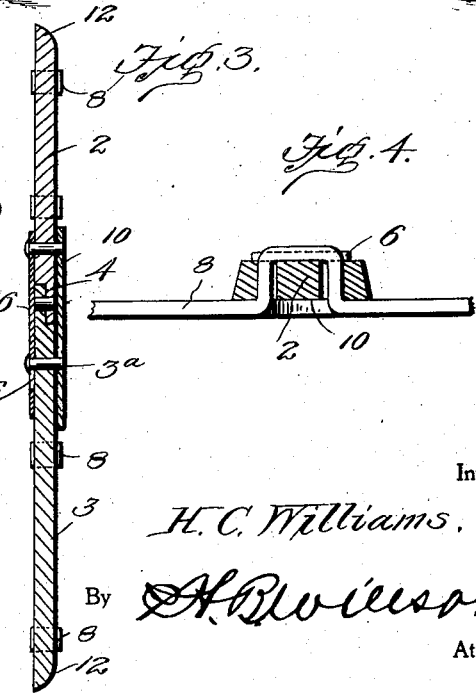
Inventor
H. C. Williams.
By H. B. Wilson
Attorney No. 737,186. Patented August 25, 1903.

UNITED STATES PATENT OFFICE.

HOSY CURTIS WILLIAMS, OF NEWSITE, MISSISSIPPI.

HOPPLE.

SPECIFICATION forming part of Letters Patent No. 737,186, dated August 25, 1903.

Application filed July 2, 1903. Serial No. 164,080. (No model.)

*To all whom it may concern:*

Be it known that I, HOSY CURTIS WILLIAMS, a citizen of the United States, residing at Newsite, in the county of Prentiss and State of Mississippi, have invented certain new and useful Improvements in Hopples; and I do declare the following to be a full, clear, and exact description of the invention, such as will enable others skilled in the art to which it appertains to make and use the same.

This invention relates to improvements in hopples for horses or other animals.

The object of the invention is to provide a hopple which will effectually prevent the animals from jumping, but will not prevent the use of the legs in walking, and which may be worn without inconvenience to the animals.

A further object is to provide a light strong hopple which can be quickly and easily applied to the leg of an animal, and which will be well adapted to the use for which it is designed.

With these and other objects in view the invention consists of certain novel features of construction, combination, and arrangement of parts, as will be more fully described, and particularly pointed out in the appended claims.

In the drawings, Figure 1 is a view of a horse, showing the application of the device. Fig. 2 is a detail front view of the device removed. Fig. 3 is a vertical sectional view; and Fig. 4 is a horizontal sectional view through the same, showing the manner of attaching the straps.

Referring to the drawings more particularly, 1 denotes the hopple, which consists of upper and lower leg-bars 2 and 3, pivoted together at their ends, as shown, the engaging ends of the bars being rabbeted, as shown at 4, to form a flush joint, and the inner corners of the rabbeted ends are rounded off, as shown at 5, thereby forming a hinge-joint to permit the bars to fold together in one direction to allow the animal to bend its knee sufficiently for walking.

6 denotes a plate arranged on the outer side of the bars 2 and 3 across the joint of the same. The upper end of the plate 6 has a pivotal engagement with the lower end of the bar 2, while the lower end of the same has a sliding engagement with the upper end of the lower bar 3 through the medium of a slot $6^a$, formed in this end of the plate, which is adapted to engage a pin or stud $3^a$ on the bar 3, as shown.

In the bars 2 and 3 are formed upper and lower pairs of transversely-disposed openings 7, and through each pair of openings is looped a strap 8, having on one end a buckle 9, by which the bars are attached to the leg of the animal. On the inner side of the bars 2 and 3, across the joint of the same, is arranged a pad 10, of felt, leather, or other material, which protects the knee of the animal from injury. The upper and lower ends of the bars 2 and 3 are beveled or rounded outwardly, as shown at 12, so that there will be no sharp corners to injure the leg of the animal.

The hopple is usually placed upon one of the fore legs of the animal, but may be applied to both fore legs, if desired, and when in position does not interfere with the free movement of the knee-joint in walking, but will prevent the bending of the leg sufficiently to enable the animal to jump, as it is well known that in jumping the fore legs are bent up under the body, and this is prevented by the slotted connection of the plate 6 with the lower bar 3, which limits the folding of the bars, and consequently the bending of the knee.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. In a device of the character described, the combination of upper and lower bars pivotally connected together at their ends to fold, means for limiting said folding movement, and means for connecting the bars to the leg of an animal, substantially as described.

2. In a device of the character described, the combination of upper and lower bars pivotally connected together at their ends to form a folding flush joint, a plate pivotally connected at one end to one of said bars and having a sliding connection with the other bar whereby the folding of said bars is limited, and means whereby said bars are connected to the leg of the animal above and below the knee-joint, substantially as described.

3. In a device of the character described, the combination of upper and lower bars pivotally connected together at their ends to form a folding flush joint, and having rounded or beveled upper and lower ends, a plate having a pivotal connection with one of said bars and a pin-and-slot connection with the other bar whereby the folding of said bars is limited, pairs of slots formed transversely through said bars, straps passed through said slots whereby said bars are fastened to the leg of an animal, and a pad arranged across the joint on the inner side of said bars, substantially as described.

In testimony whereof I have hereunto set my hand in presence of two subscribing witnesses.

HOSY CURTIS WILLIAMS.

Witnesses:
W. J. LOWREY,
E. B. CLEVELAND.